March 22, 1960
V. KRUML ET AL
2,929,917
ELECTRIC INSTALLATION IN CIRCUMFERENTIAL
SEAM WELDING APPARATUS
Filed July 1, 1958
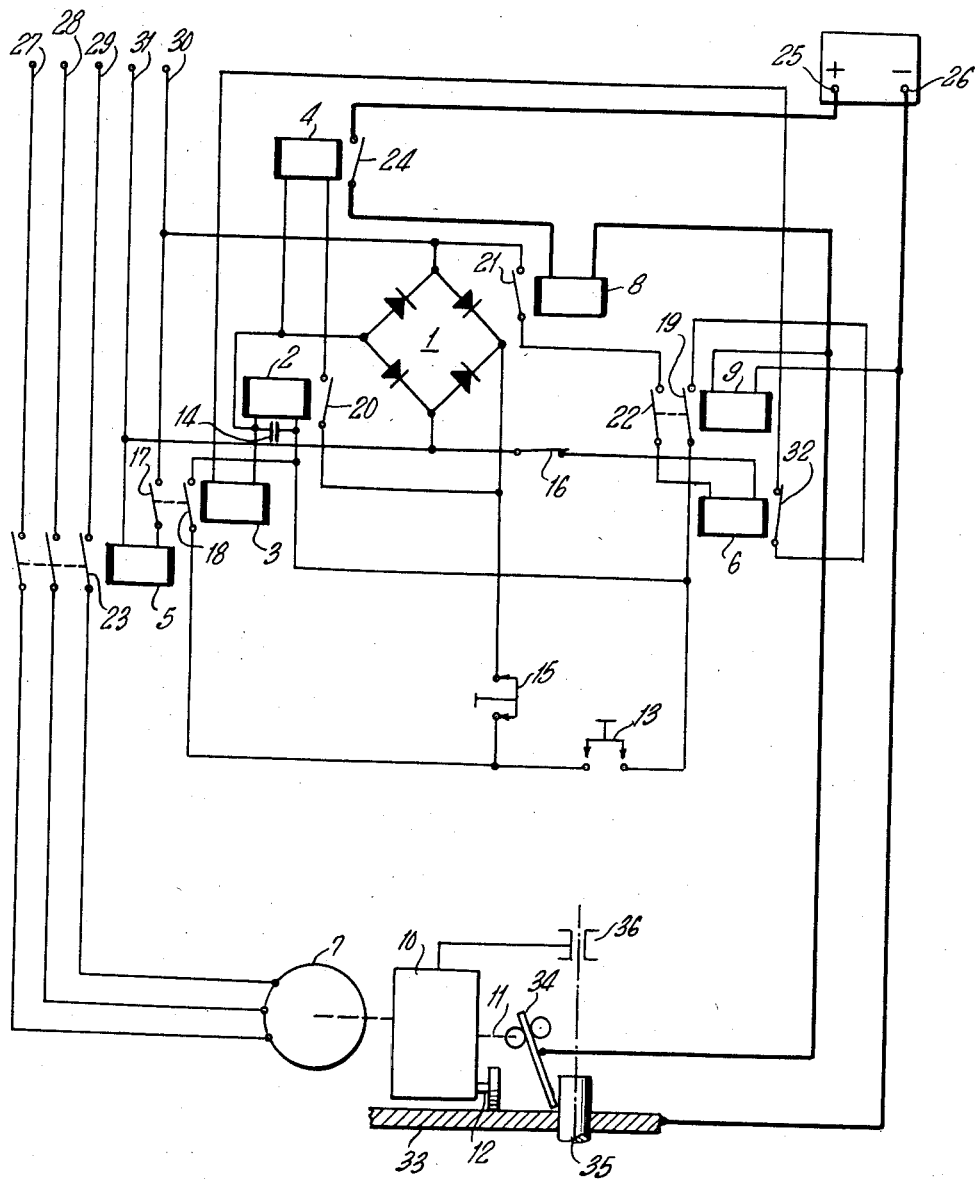
VINCENC KRUML
ALEŠ BRABENEC
VLADIMIR ŠULC
INVENTORS
BY
ATTORNEY

United States Patent Office 2,929,917
Patented Mar. 22, 1960

2,929,917

ELECTRIC INSTALLATION IN CIRCUMFERENTIAL SEAM WELDING APPARATUS

Vincenc Kruml, Ales Brabenec, and Vladimir Šulc, all of Chotebor, Czechoslovakia, assignors to ČKD Česká Lípa, Národní podnik, Ceska Lipa, Czechoslovakia Application July 1, 1958, Serial No. 745,911

Claims priority, application Czechoslovakia July 23, 1957

3 Claims. (Cl. 219—125)

Our invention relates to the electric installations in welding apparatus particularly in circumferential seam welding apparatus in which a feeding mechanism driven by an electric motor delivers a welding rod or wire to the place where a protected electric arc forms a welding seam between the wall of an object such as a boiler and a cylindrical element such as a tube, bolt or the like.

Such welding operations have been performed up to this time manually or semi-automatically. Thus a semi-automatic movable apparatus for the welding of stay bolts to the walls of boilers is known which comprises an induction motor driving the feeding mechanism for the welding wire as well as the wire nozzle around said bolt. In this apparatus a welding electrode formed by a straight rod having a diameter of about 4 mm. is being used and this rod has to be brought into contact with the welding work before the start of each welding operation. The start and the end of each welding operation is controlled by a manually operated push button. This semi-automatic welding apparatus is unreliable and difficult to operate being dependent on the experience of the welder, this resulting in loss of time in arranging the required contact between the welding wire and the work piece and making it necessary that the welder attentively follows the movement of the wire nozzle in order to properly complete the seam. The said disadvantages protract the operation to such degree that the semi-automatic welding is not superior to the manual welding.

It is an object of our invention to avoid the said disadvantages and to provide a fully automatic apparatus for the welding of cylindrical parts such as stay bolts, tubes or the like to the walls or other parts of any work piece such as boilers, coolers or the like.

According to our invention we control the welding operation by a combination of relays namely a time relay setting-up the time for the welding operation, a relay responding to the welding current, and a relay responding to the voltage of the welding arc, these three relays controlling over an auxiliary circuit the said electric motor of the welding apparatus, the welding circuit and the auxiliary or control circuit.

The said and other objects of our invention will be more fully understood from the following specification when read with the accompanying drawing in which a circumferential seam welding apparatus is diagrammatically shown together with its electric installation.

A rectifier 1, for example a selenium rectifier, is attached to an auxiliary A.C. circuit fed over terminals 30, 31. Into the rectified branch current are inserted the coil of a first auxiliary relay 2—20 and of a second auxiliary relay 3—17—18, respectively, and also the coil of a first contactor 4—24 which controls the welding current fed over the terminals 25, 26. The said auxiliary A.C. circuit contains further the coil 5 of a second contactor 5—23 which controls the induction motor 7, and the coil 6 of a time-relay 6—32.

The electric motor 7 drives over a transmission gear (not shown) within a casing 10 a feeding apparatus 11 for the welding rod or wire 34 and a mechanism 12 for circumferentially displacing the welding wire nozzle along the welding seam to be formed between the cylindrical object 35 such as a stay bolt or tube and the work piece 33.

The said welding current fed over the terminals 25, 26 and governed by the contactor 4—24 contains in series the coil of a current responsive relay 8—21, and in parallel to the electric welding arc formed between the work piece 33 and the welding wire 34 the coil 9 of a voltage responsive relay operating the contacts 19 and 22.

The welding operation is initiated by depressing the pushbutton switch 13 whereby the coil 2 of the first auxiliary relay 2—20 is energized, its contact 20 closing the circuit containing the coil 4 of the contactor 4—24 which by its contact 24 controls the welding current. This contact 24 when closed causes the coil 9 of the voltage relay 9—19—22 to be energized and to close by its contact 19 the circuit containing the coil 3 of the second auxiliary relay 3—17—18 which comprises an automatic guard or holder contact 18 and an operating contact 17. This contact 17 when closed brings into action the contactor 5—23 comprising the coil 5 and the contacts 23 which switch in the electric motor 7. The now operating motor 7 starts to drive the feeding apparatus 11 for the welding wire and the displacing mechanism 12 referred to above. When the welding wire or rod 34 touches the work piece 33 the arising short-circuit causes the voltage in coil 9 to drop to zero and thus the contacts 19 and 22 are opened. While these actions occur, the pushbutton switch 13 has to be held closed. The now deenergized coil 3 of the second auxiliary relay opens the contact 17, thus causing the contactor 5—23 to switch off the motor 7. Thereby the feed of the welding wire 34 is interrupted until another welding arc arises. The short-circuit current energizes the coil 8 of the current responsive relay 8—21 and its closed contact 21 together with the closed contact 22 operated by the coil 9 of the said voltage responsive relay close the auxiliary circuit containing the coil 6 of the time relay 6—32. As soon as the welding arc forms a voltage appears on the coil 9 closing the contacts 19 and 23 and the second auxiliary relay 3—17—18 closes its contacts 17 and 18. Now the pushbutton switch 13 may be released in view of the action of the holder contact 18. The closed contact 17 closes the circuit containing the contactor coil 5 and the actuated contacts 23 switch on the electric motor 7 which now resumes to drive the feeding apparatus 11 for the welding wire 34 and the said displacing mechanism 12. At the same time while a welding arc arises the voltage responsive relay by its contact 22 closes the circuit containing the coil 6 of the time relay which initiates the timing of the welding process by cooperation of the said voltage responsive and the current responsive relays, respectively. After expiration of the time set by the time relay its contact 32 opens causing the opening of the contact 17 of the second auxiliary relay 3—17 and consequently also of the contacts 23 of the contactor 5—23 so that the electric motor 7 is shut off and the feed of the welding wire is terminated. The guard or holder contact 18 actuated by the coil 3 of said second auxiliary relay interrupts the circuit containing the coil 2 of the first auxiliary relay 2—20. Said coil 2 is shunted by a condenser 14 which causes a delayed opening of the contact 20 and thus also a delayed opening of the contact 24 of the contactor 4—24 which controls the welding current. This delayed breaking of the welding current results in a burning of the end portion of the welding wire so that a cohesion of the welding wire 34 to the welding work 33 is prevented. The manually operated circuit breaking switch 16 permits, if desired, to open the circuit containing the coil 6 of the time relay 6—32 and thus eliminating this relay and permitting to operate the welding apparatus without timing; in such case the welding operation is terminated by opening i.e. depressing the switching-off pushbutton 15.

While specific embodiments of our invention have been shown and described in detail to illustrate the application of the principles of our invention, it will be well understood that the same may be otherwise embodied without departing from said principles and without avoiding the scope of the appended claims.

What we claim as our invention is:

1. An electric installation particularly for an electric arc welding apparatus for welding cylindrical elements such as stay bolts or tubes to a workpiece such as walls of boilers or other vessels, said apparatus including an electric motor driving a feeding apparatus for the welding wire and a displacing mechanism for the wire nozzles, said electric installation comprising a motor circuit; a welding circuit; an independently energized auxiliary circuit; a tripcoil operated switch controlling said motor circuit; a tripcoil operated current relay actuated by the welding circuit; a tripcoil operated voltage relay responsive to the voltage of the welding circuit; a tripcoil operated time switch in the auxiliary circuit; the contacts of the current relay and of the voltage relay controlling the auxiliary circuit being in series with the tripcoil of the time switch; a tripcoil operated circuit breaker controlling the welding circuit and actuated by the auxiliary circuit; a tripcoil operated first auxiliary relay in the auxiliary circuit controlling the tripcoil of said circuit breaker; a press button switch operating said first auxiliary relay; a tripcoil operated second auxiliary relay in the auxiliary circuit; said second auxiliary relay comprising a first holding contact overbridging said press button switch and a second holding contact controlling the tripcoil of said motor circuit switch; and the contact of the time switch, the tripcoil of the second auxiliary relay and the contact of the voltage relay being in series within the auxiliary circuit and in parallel to the tripcoil of the first auxiliary relay.

2. An electric installation according to claim 1 and comprising a manually operable circuit breaking switch in series with the coil of the time relay and a switching-off pushbutton between the source of the auxiliary current and the parallel arranged coils of the first and the second auxiliary relay.

3. An electric installation according to claim 1 and comprising a condenser arranged in parallel to the coil of the first auxiliary relay, so that the closing of the contact of this relay will be accompanied by a delay in the opening of the welding circuit until the electric motor has come to rest.

References Cited in the file of this patent
UNITED STATES PATENTS

| | | |
|---|---|---|
| 2,030,689 | Donat | Feb. 11, 1936 |
| 2,151,378 | Elsey et al. | Mar. 21, 1939 |